United States Patent
Chen et al.

(10) Patent No.: US 6,597,752 B1
(45) Date of Patent: Jul. 22, 2003

(54) METHOD FOR DETECTING A DOTTING SEQUENCE FOR MANCHESTER ENCODED DATA IN A DEEP FADING ENVIRONMENT

(75) Inventors: Feng Chen, Bethlehem, PA (US); David L. Price, Coopersburg, PA (US)

(73) Assignee: Agere Systems Inc., Berkley Heights, NJ (US)

( * ) Notice: Subject to any disclaimer, the term of this patent is extended or adjusted under 35 U.S.C. 154(b) by 0 days.

(21) Appl. No.: 09/256,573

(22) Filed: Feb. 24, 1999

(51) Int. Cl.[7] .................................................. H04L 7/00
(52) U.S. Cl. ........................ 375/361; 375/282; 375/228; 375/316; 375/360
(58) Field of Search ................................. 375/361, 282, 375/224, 228, 316, 359, 360, 354

(56) References Cited

U.S. PATENT DOCUMENTS

| | | | | |
|---|---|---|---|---|
| 4,012,697 A | * | 3/1977 | Ballinger ..................... 327/166 |
| 4,232,387 A | * | 11/1980 | Cottatellucci ................. 341/70 |
| 4,330,862 A | * | 5/1982 | Smolik ....................... 375/316 |
| 4,513,427 A | * | 4/1985 | Borriello et al. ............. 370/517 |
| 4,584,690 A | * | 4/1986 | Cafiero et al. ................ 327/76 |
| 4,787,096 A | * | 11/1988 | Wong ......................... 329/306 |
| 4,982,110 A | * | 1/1991 | Yokogawa et al. ........... 327/141 |
| 5,050,194 A | * | 9/1991 | Pickering et al. .............. 327/7 |
| 5,056,114 A | * | 10/1991 | Wight ......................... 375/333 |
| 5,349,610 A | * | 9/1994 | Sakamoto et al. ........... 375/354 |
| 5,459,765 A | * | 10/1995 | Meyer et al. ................. 327/12 |
| 5,475,705 A | * | 12/1995 | Dent .......................... 329/304 |
| 5,600,634 A | * | 2/1997 | Satoh et al. ................. 370/294 |
| 5,696,800 A | * | 12/1997 | Berger ........................ 375/282 |
| 5,864,762 A | * | 1/1999 | Childress et al. ............ 455/509 |
| 6,108,542 A | * | 8/2000 | Swanchara et al. .......... 455/434 |

* cited by examiner

Primary Examiner—Chi Pham
Assistant Examiner—Pankaj Kumar
(74) Attorney, Agent, or Firm—Jean-Marc Zimmerman

(57) ABSTRACT

A method for a cellular telephone receiver to detect the presence of a dotting sequence for a Manchester encoded cellular signal in a deep fading environment, wherein the presence of a single edge transition during the mask pulse for a predetermined number of consecutive clock cycles and the absence of any transition edges outside of the mask pulse for the predetermined number of consecutive clock cycles, indicate the presence of a dotting sequence and that the cellular receiver locked to a masked edge, thereby preventing the receiver from receiving the signal. In response, the receiver will shift the phase of its clock by 180 degrees so that it can lock to an unmasked edge of the cellular signal and thereby receive the signal. By contrast, the absence of any transition edges or the presence of more than one transition edge during the mask pulse indicates that the receiver is not receiving the cellular signal because of deep fading and not because it locked to a masked edge of the signal during the dotting sequence. In response, the receiver will not shift the phase of its clock, but will instead remain locked to an unmasked edge so that it can receive the cellular signal once the deep fading ceases.

31 Claims, 4 Drawing Sheets

FIG. 1A
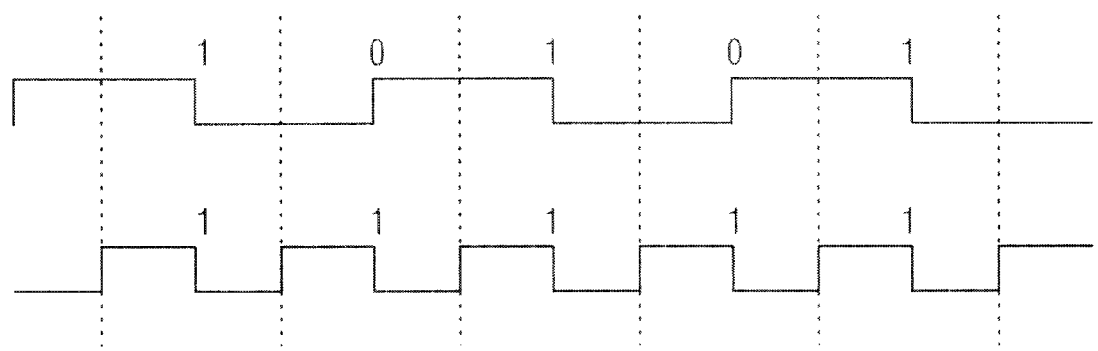
FIG. 1B
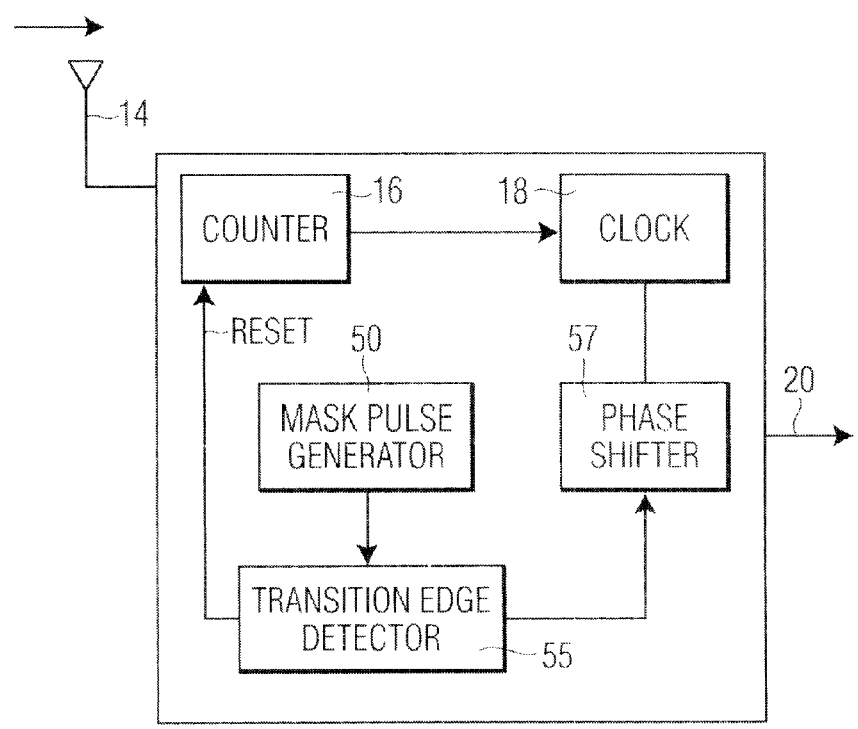
FIG. 2

METHOD FOR DETECTING A DOTTING SEQUENCE FOR MANCHESTER ENCODED DATA IN A DEEP FADING ENVIRONMENT

FIELD OF THE INVENTION

The present invention relates to the field of cellular telephone systems, and more particularly to a method for detecting the presence of a dotting sequence for a Manchester encoded signal in a deep fading environment.

BACKGROUND OF THE INVENTION

Cellular telephone systems are widely used today throughout the world. Such systems are implemented either as analog or digital systems. In certain analog and digital systems, data is encoded using an encoding scheme known as Manchester encoding in which each nonreturn-to-zero binary one is transformed to a zero-to-one transition, and each nonreturn-to-zero binary zero is transformed to a one-to-zero transition. The ability to correctly detect Manchester encoded data is crucial to the proper operation of conventional cellular telephone systems.

Manchester encoded data signals present a single transition edge when the cellular signal is comprised of alternating ones and zeros as shown in FIG. 1A, or two transition edges when the signal is comprised of a sequence of all ones or all zeros as shown in FIG. 1B. In the latter case, the edges coinciding with the vertical dashed lines must be ignored in order for a cellular telephone receiver to receive the cellular signal.

Conventional cellular telephone systems employ a fixed frequency tone comprised of an alternating sequence of ones and zeros, i.e., 10101010, known as a dotting sequence to initialize the phase of the clock of the cellular receiver. Upon receipt of the dotting sequence, the receiver locks to one transition edge of the cellular signal waveform and generates a mask pulse to mask the other edge of the signal. The masked edge is 180 degrees out of phase with the locked edge. If at the end of the dotting sequence the receiver is locked to the correct edge, it can receive the cellular signal without having to shift the phase of its clock. However, if at the end of the dotting sequence the receiver is locked to the incorrect edge of the signal such that the correct edge is masked and no transition edges have appeared for a predetermined number of consecutive clock cycles which are shorter in duration than the dotting sequence, then the receiver can not receive the cellular signal, and it shifts the phase of its clock by 180 degrees so that it can lock to the correct edge and receive the cellular signal.

Conventional cellular receivers suffer from a significant drawback. Specifically, in environments where deep fading of a cellular signal occurs such that the signal can not be received, conventional cellular receivers interpret the absence of edge transitions as indicating that a dotting sequence is present and that the receiver locked to the wrong edge. In response the receiver shifts the phase of its clock by 180 degrees. Consequently, if the receiver was locked to the correct edge of a signal before the deep fading, by shifting its phase 180 degrees, it will then be locked to an incorrect edge of the signal once the deep fading ceases. The receiver will therefore be rendered inoperable, being unable to receive any intelligible data until the next dotting sequence reinitializes its clock.

SUMMARY OF THE INVENTION

A method for a cellular telephone receiver to detect the presence of a dotting sequence for a Manchester encoded cellular signal in a deep fading environment, wherein both the presence of a single edge transition during the mask pulse and the absence of any transition edges outside of the mask pulse for a predetermined number of consecutive clock cycles, indicate the presence of a dotting sequence and that the receiver locked to a masked edge, thereby preventing the receiver from receiving the signal. In response, the receiver will shift the phase of its clock by 180 degrees so that it can lock to an unmasked edge of the cellular signal and thereby receive the signal.

The absence of any transition edges or the presence of more than one transition edge during the mask pulse indicates that the receiver is not receiving the cellular signal because of deep fading and not because it locked to a masked edge of the signal during the dotting sequence. In response, the receiver will not shift the phase of its clock, but will instead remain locked to an unmasked edge so that it can receive the cellular signal once the deep fading ceases.

BRIEF DESCRIPTION OF THE FIGURES

FIGS. 1A and 1B show two Manchester encoded cellular telephone signals.

FIG. 2 shows a block diagram of an exemplary embodiment of an improved cellular telephone according to the present invention.

DETAILED DESCRIPTION

Figure 3:
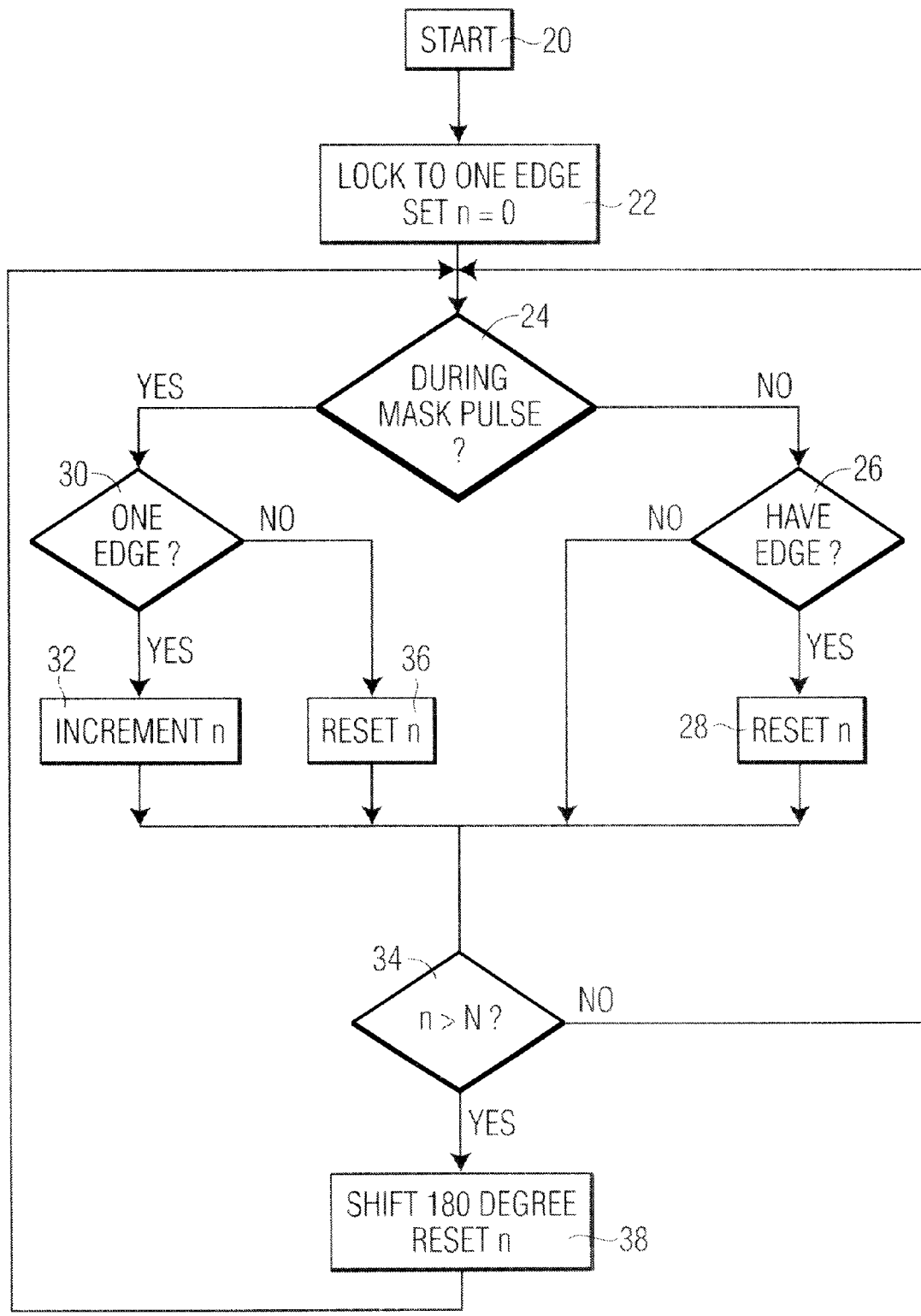
FIG. 3 shows a flowchart depicting the operation of the present invention.

FIG. 2 shows an exemplary embodiment of a cellular telephone receiver 10 according to the present invention for detecting the presence of a dotting sequence for Manchester encoded data in a deep fading environment. Receiver 10 is implemented as part of a conventional cellular communications system in which a Manchester encoded cellular signal 12 is received by an antenna 14. Receiver 10 includes a counter 16 and a clock 18, and generates a conventionally produced cellular output 20.

The cellular telephone receiver 10 comprises clock 18 wherein the dotting sequence initializes the clock 18 of the receiver 10. Additionally, the cellular telephone receiver 10 locks to a first transition edge of a dotting sequence component of the cellular signal 12. The cellular telephone receiver 10 further comprises a mask pulse generator 50 for generating a mask pulse; and a transition edge detector 55, wherein if the transition edge detector 55 detects both the presence of the first transition edge during the mask pulse for a predetermined number of consecutive clock cycles and the absence of any transition edges outside of the mask pulse for a predetermined number of consecutive clock cycles, then the dotting sequence has been detected, and an inability of the cellular telephone receiver 10 to receive the cellular signal 12 is due to the first transition edge being masked and not to deep fading of the cellular signal 12.

The cellular telephone receiver 10 further comprises a phase shifter 57, wherein if the first transition edge is masked, the phase shifter 57 shifts the phase of the clock 18 180 degrees so that the receiver 10 can lock to a second transition edge which is not masked, thereby enabling the improved cellular telephone receiver 10 to receive the cellular signal 12.

The operation of the present invention is shown in flowchart form in FIG. 3. At step 20, receiver 10 receives signal 12. At step 22, receiver 10 locks to one transition edge of signal 12, and clock 18 is initialized by the dotting sequence with counter 16 being set to n=0, where n denotes the number of consecutive clock cycles which have transpired. Also at step 22, receiver 10 generates a mask pulse to mask the edge of signal 12 that it did not lock to, the masked edge being 180 degrees out of phase with the locked edge. Counter 16 is used to count the number of consecutive clock cycles during which a single edge is present during the mask pulse.

At step 24, the present invention determines whether a mask pulse is present. If no mask pulse is present, then at step 26 receiver 10 determines whether an edge is present outside of the mask pulse. If no edge is present, and so long as n is less than N at step 34, where N is a predetermined period of time shorter in duration than the dotting sequence, the interrogation process continues at step 24.

If, however, at step 26 a transition edge is present outside of the mask pulse, then at step 28, counter 16 is reset to n=0 since the presence of the edge outside of the mask pulse indicates that receiver 10 is locked to the correct edge and is receiving intelligible data from signal 12. Consequently, it is not necessary to increment counter 16 to determine if N period of time has elapsed which would indicate that receiver 10 locked to the incorrect edge of signal 12 and was not receiving signal 12. The interrogation process then continues at step 24.

If at step 24 a mask pulse is present, then at step 30 receiver 10 determines how many edges are present during the mask pulse. If a single edge is present, then at step 32, counter 16 is incremented by one. The presence a single edge during the mask pulse indicates that receiver 10 locked to an incorrect edge. If at step 34, n is less than N, the interrogation process will continue at step 24 with counter 16 being incremented by one each subsequent consecutive clock cycle during which a single edge is present during a mask pulse until n is greater than N.

When n is greater than N, receiver 10 concludes both that a dotting sequence is present and that its failure to receive signal 12 is due to its having locked to an incorrect edge and not to deep fading of signal 12. In response, receiver 10 will shift its phase 180 degrees in order to lock to the correct edge of signal 12, and will reset counter 16 to n=0. The interrogation process will then begin anew at step 24.

If at step 30, either no transition edges or more than one edge are present during the mask pulse, then at step 36 counter 16 is reset to zero because the absence of any edges or the presence of more than one edge during the mask pulse each indicate that receiver 10 is either locked to the correct edge or is unable to receive intelligible data because of deep fading of signal 12. The interrogation process then begins anew at step 24.

Figure 4:
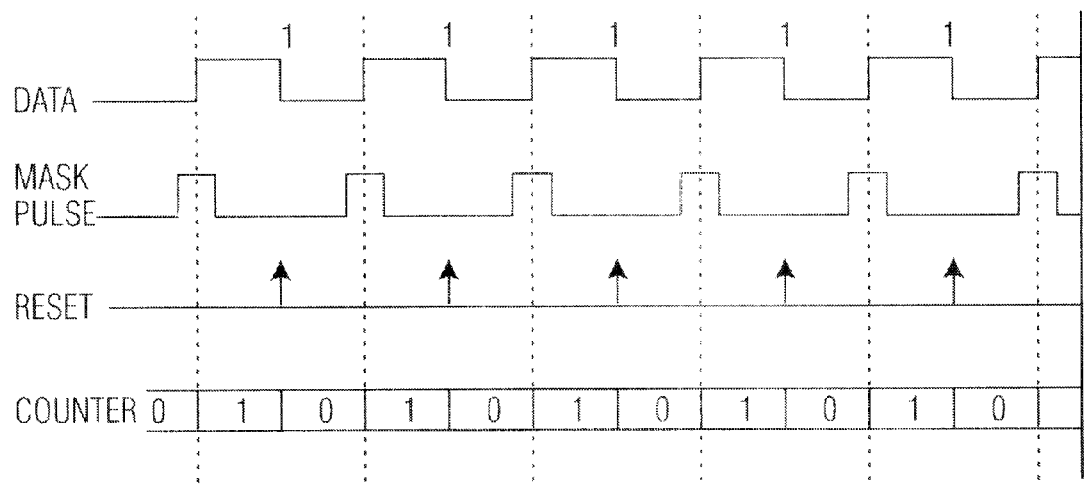
FIG. 4 shows Data, Mask, Reset and Counter signals received and generated by the receiver shown in FIG. 2, wherein the receiver is locked to the correct data transition edges.
Figure 5:
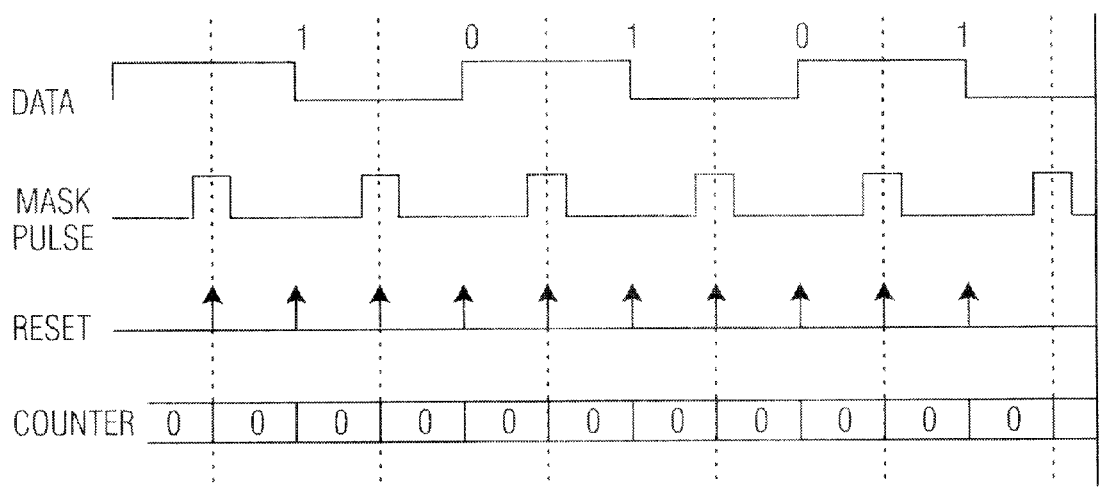
FIG. 5 shows Data, Mask, Reset and Counter signals received and generated by the receiver shown in FIG. 2, wherein the receiver is locked to the correct data transition edges.
Figure 6:
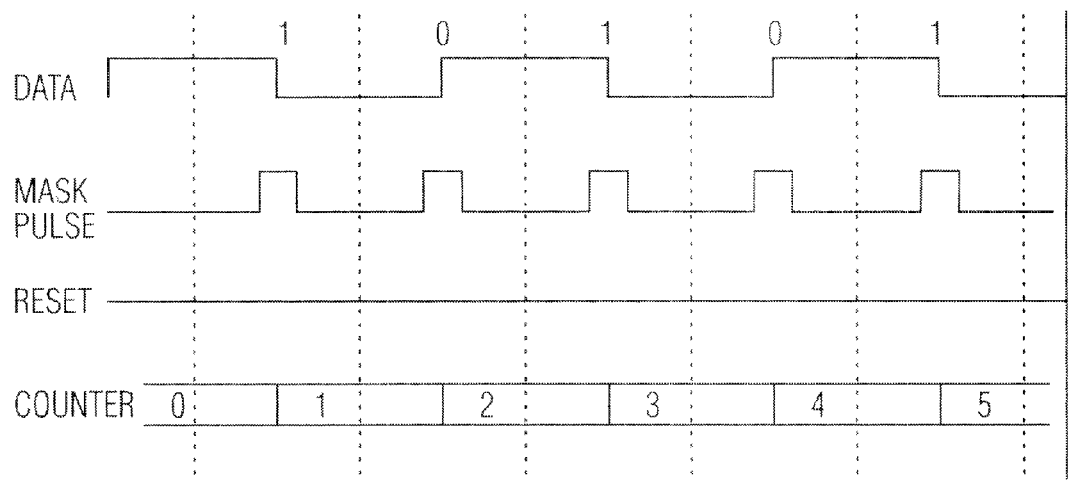
FIG. 6 shows the Data, Mask, Reset and Counter signals received and generated by the receiver shown in FIG. 2, wherein the receiver is locked to the incorrect data transition edges.
Figure 7:
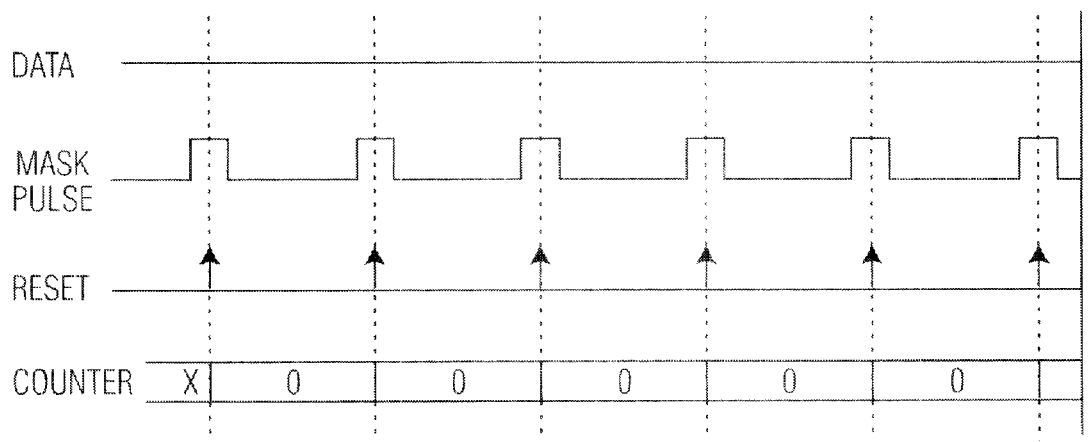
FIG. 7 shows the Data, Mask, Reset and Counter signals received and generated by the receiver shown in FIG. 2 during deep fading of the cellular signal.

FIGS. 4 and 5 show receiver 10 locked to the correct edge of signal 12. The presence of a transition edge outside of the mask pulse will reset counter 16 every clock cycle so that receiver 10 remains locked to the correct edge. FIG. 6 shows receiver 10 locked to an incorrect edge of signal 12 resulting in the presence of a transition edge during the mask pulse. FIG. 7 shows a deep fading environment in which receiver 10 is unable to receive signal 12.

Referring again to FIG. 4, the Data signal illustrates a series of ones representing a correctly received data, such as shown in FIG. 1B. The Mask pulse signal illustrates a mask pulse generated by the mask pulse generator 50. The Reset signal illustrates when the reset signal is generated to reset the counter 16. The Counter signal illustrates the counting cycle of counter 16 when a correct dotting sequence is received for a Data signal of a series of ones. With reference to FIG. 3, the cellular telephone receiver 10 employs conventional techniques to lock to one edge of a dotting sequence, as previously acknowledged. The dotting sequence is used to initialize the clock 18 of the receiver 10 and the counter 16 is equal to zero (n=0), at Step 22. Step 22 is followed by Step 24. There is a mask pulse and as observed, during the mask pulse there is one edge as evidenced by the dotted vertical line. Accordingly, Step 24 is followed by Step 30. Since there is one edge present, Step 30 is followed by Step 32. Thus, the counter 16 (n) is incremented to one (1). At Step 34, the process loops back again to Step 24.

As can be observed, during the next part of the signal, there is no mask pulse present. Accordingly, Step 24 is followed by Step 26, where a determination is made whether there is an edge. Here there is an edge present. Therefore, Step 26 is followed by Step 28 where the counter 16 (n) is reset to zero (0).

Since the Data and Mask pulse signals repeat themselves, the operation described above would repeat itself.

Referring now to FIG. 5, the Data signal is comprised of alternating ones and zeros, as also shown in FIG. 1A. Accordingly, the dotting sequence initializes the clock 18 of the receiver 10 and the counter 16 is equal to zero (n=0), at Step 22. Here with the Data signal shown in FIG. 5, during the mask pulsed (Step 24), as evidenced by the dotted vertical line, there is no edge (Step 30) so the counter is reset (n=0) at Step 36. Since n is not>N at Step 34, the process returns to Step 24. During the next part of the signal, there is no mask pulse (Step 24). At Step 26, as is observed, there is an edge outside of the mask pulse. Therefore, Step 26 is followed by Step 28 where the counter is reset (n=0). Since the Data waveform repeats itself as well as this process. The counter 16 remains at zero.

The difference between FIGS. 4 and 5 are waveforms.

Referring now to FIG. 6, in comparison to FIG. 5, the same Data signal is used. However, the difference being that the receiver 10 locked to the incorrect edge of signal 12. With reference to FIG. 3, the receiver 10 was initialized to the dotting sequence and n=0 (Step 22). At the first dotted vertical line, there is no mask pulse, since the receiver incorrectly locked to the wrong edge. Accordingly, Step 24 is followed by Step 26. At Step 26, it can be seen that there is no edge. Thus, Step 26 is followed by Step 34. Since n is not>N, the process returns to Step 24. At step 24, during the next part of the Data signal there is a mask pulse. Hence, Step 24 is now followed by Step 30. At Step 30, there is one edge. Accordingly, Step 30 is followed by Step 32 where the counter 16 (n) is incremented. Step 32 is followed by Step 34. At Step 34, the process returns to Step 24. During the next part of the Data signal, there is no mask pulse. Thus, Step 24 is followed by Step 26. Since there is no edge, Step 26 is followed by Step 34 where the process loops back again to Step 24. During the next part of the Data signal, Step 24 is again followed by Step 30 where one edge is detected. Thus, Step 30 is followed by Step 32 where n is incremented to two (2). This process continually increments the counter until n>N, since the Data signal repeats itself. When n is>N, the process flows to Step 38 where the phase is shifted 180 degrees and n is reset.

The difference between FIG. 5 and FIG. 6 is that FIG. 5 is a correctly received signals.

Referring now to FIG. 7, as shown the Data signal has no edges. At Step 22, the mask pulse was initialized by the dotting sequence. Since the Data waveform has no edges, during the mask pulse, n is reset at Step 36. Furthermore, since there is no edge detected when the mask pulse is not present, the process loops back from Step 26 to Step 24 via Step 34.

The present invention can be implemented using either hardware as an application specific integrated circuit (ASIC), or using software as a digital signal processor, a microprocessor or a microcontroller.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure and method may be varied substantially without departing from the spirit of the invention and the exclusive use of all the modifications which come within the scope of the appended claims is reserved.

What is claimed is:

1. A method for detecting a dotting sequence for a Manchester encoded cellular signal in a deep fading environment, comprising the steps of:
   locking a receiver having a clock to a first transition edge of a Manchester encoded cellular telephone signal having a dotting sequence;
   generating a mask pulse; and
   determining whether the first transition edge is present during the mask pulse for a predetermined number of consecutive clock cycles, wherein both the presence of the first transition edge during the mask pulse for the predetermined number of consecutive clock cycles and the absence of any other transition edges outside of the mask pulse indicate the presence of the dotting sequence.

2. The method according to claim 1, wherein the receiver includes a counter, and further comprising the step of incrementing the count of the clock by one each successive clock cycle during which both the first transition edge is present during the mask pulse and no transition edges are present outside of the mask pulse, until the predetermined number of consecutive clock cycles have been attained.

3. The method according to claim 1, further comprising the step of the receiver switching the phase of the clock by 180 degrees in order for the receiver to lock to a second transition edge which is not masked so that the receiver can receive the cellular signal.

4. The method according to claim 1, wherein the predetermined number of consecutive clock cycles corresponds to a period of time shorter in duration than the dotting sequence.

5. The method according to claim 1, wherein if both the first transition edge and at least one other transition edge are sent during the mask pulse for the predetermined number of consecutive clock cycles, the dotting sequence is not present, and an inability of the receiver to receive the cellular signal is due to deep fading of the cellular signal.

6. The method according to claim 5, wherein the receiver does not shift the phase of the clock by 180 degrees, thereby enabling the receiver to remain locked to the first transition edge and thus able to receive the cellular signal once the deep fading ceases.

7. The method according to claim 1, wherein the absence both of the first transition edge and any other transition edges during the mask pulse for the predetermined number of consecutive clock cycles indicates both the absence of the dotting sequence and that the first transition edge is not masked, and that an inability of the receiver to receive the cellular signal is due to deep fading of the cellular signal.

8. The method according to claim 7, wherein the receiver does not shift the phase of the clock by 180 degrees, thereby enabling the receiver to remain locked to the first transition edge and thus able to receive the cellular signal once the deep fading ceases.

9. A method for a cellular telephone receiver to detect the presence of a dotting sequence for a Manchester encoded cellular signal in a deep fading environment, comprising the steps of:
   locking a receiver having a clock to a first transition edge of a Manchester encoded cellular signal having a dotting sequence;
   generating a mask pulse; and
   determining whether the first transition edge is present during the mask pulse for a predetermined number of consecutive clock cycles and whether no transition edges are present outside of the mask pulse for the predetermined number of consecutive clock cycles, wherein if both the first transition edge is present during the mask pulse for the predetermined number of consecutive clock cycles and no transition edges are present outside of the mask pulse for the predetermined number of consecutive clock cycles, then the dotting sequence is present and the first transition edge is masked, and the receiver is therefore unable to receive the intelligible data from the cellular signal.

10. The method according to claim 9, further comprising the step of the receiver switching the phase of the clock by 180 degrees in order for the receiver to lock to a second transition edge which is not masked so that the receiver can receive intelligible data from the cellular signal.

11. The method according to claim 9, wherein the receiver includes a counter, and further comprising the step of incrementing the count of the clock by one each successive clock cycle during which both the first transition edge is present during the mask pulse and no transition edges are present outside of the mask pulse, until the predetermined number of clock cycles have been attained.

12. The method according to claim 9, wherein the predetermined number of consecutive clock cycles corresponds to a period of time shorter in duration than the dotting sequence.

13. The method according to claim 9, wherein if both the first transition edge and at least one other transition edge are present during the mask pulse for the predetermined number of consecutive clock cycles, the dotting sequence is not present, and an inability of the receiver to receive intelligible data from the cellular signal is due to deep fading of the cellular signal.

14. The method according to claim 13, wherein the receiver does not shift the phase of the clock by 180 degrees, thereby enabling the receiver to remain locked to the first transition edge and thus able to receive intelligible data from the cellular signal once the deep fading ceases.

15. The method according to claim 9, wherein the absence both of the first transition edge and any other transition edges during the mask pulse for the predetermined number of consecutive clock cycles indicates both the absence of the dotting sequence and that the first transition edge is not masked, and that an inability of the receiver to receive intelligible data from the cellular signal is due to deep fading of the cellular signal.

16. The method according to claim 15, wherein the receiver does not shift the phase of the clock by 180 degrees, thereby enabling the receiver to remain locked to the first transition edge and thus able to receive intelligible data from the cellular signal once the deep fading ceases.

17. A method for detecting a bit synchronization component of a Manchester encoded cellular signal, comprising the steps of:
  locking a cellular telephone receiver having a clock to a first transition edge of a bit synchronization component of a Manchester encoded cellular signal;
  generating a mask pulse;
  determining whether the first transition edge is present during the mask pulse for a predetermined number of consecutive clock cycles; and
  determining whether any transition edges are present outside of the mask pulse for the predetermined number of consecutive clock cycles, wherein if both the first transition edge is present during the mask pulse and no transition edges are present outside of the mask pulse for the predetermined number of consecutive clock cycles, then the dotting sequence is present and an inability of the receiver to receive the cellular signal is due to the first transition edge being masked.

18. The method according to claim 17, further comprising the step of the receiver switching its phase by 180 degrees in order to lock to a second transition edge which is not masked so that the receiver can receive the cellular signal.

19. The method according to claim 17, wherein the bit synchronization component of the Manchester encoded cellular signal is a dotting sequence used to initialize the clock of the receiver.

20. The method according to claim 19, wherein the predetermined number of clock cycles corresponds to a period of time shorter in duration than the dotting sequence.

21. The method according to claim 17, wherein if both the first transition edge and at least one other transition edge are present during the mask pulse for the predetermined number of consecutive clock cycles, the dotting sequence is not present, and an inability of the receiver to receive the cellular signal is due to deep fading of the cellular signal.

22. The method according to claim 17, wherein the absence both of the first transition edge and any other transition edges during the mask pulse for the predetermined number of consecutive clock cycles indicates both the absence of the dotting sequence and that the first transition edge is not masked, and that an inability of the receiver to receive the cellular signal is due to deep fading of the cellular signal.

23. An cellular telephone receiver for detecting a dotting sequence component of a Manchester encoded cellular signal in a deep fading environment, comprising:
  a clock, wherein a cellular telephone receiver locks to a first transition edge of a dotting sequence component of a cellular signal;
  a mask pulse generator for generating a mask pulse; and
  a transition edge detector, wherein if the transition edge detector detects both the presence of the first transition edge during the mask pulse for a predetermined number of consecutive clock cycles and the absence of any transition edges outside of the mask pulse for a predetermined number of consecutive clock cycles, then the dotting sequence has been detected, and an inability of the cellular telephone receiver to receive the cellular signal is due to the first transition edge being masked and not to deep fading of the cellular signal.

24. The cellular telephone receiver according to claim 23, further comprising a phase shifter, wherein if the first transition edge is masked, the phase shifter shifts the phase of the clock 180 degrees so that the receiver can lock to a second transition edge which is not masked, thereby enabling the improved cellular telephone receiver to receive the cellular signal.

25. The cellular telephone receiver according to claim 23, wherein the dotting sequence initializes the clock of the receiver.

26. An integrated circuit for detecting a dotting sequence component of a Manchester encoded cellular signal in a deep fading environment, comprising:
  a clock;
  a mask pulse generator for generating a mask pulse; and
  a transition edge detector, wherein if the transition edge detector detects both the presence of a first transition edge during the mask pulse for a predetermined number of consecutive clock cycles and the absence of any transition edges outside of the mask pulse for a predetermined number of consecutive clock cycles, then a dotting sequence has been detected, and an inability to receive a cellular signal is due to the first transition edge being masked and not to deep fading of the cellular signal.

27. The integrated circuit according to claim 26, wherein the integrated circuit is an application specific integrated circuit.

28. The integrated circuit according to claim 26, further comprising:
  a software program implemented on the integrated circuit.

29. The integrated circuit according to claim 28, wherein the integrated circuit is a digital signal processor.

30. The integrated circuit according to claim 28, wherein the integrated circuit is a microprocessor.

31. The integrated circuit according to claim 28, wherein the integrated circuit is microcontroller.

* * * * *